Figure 1:
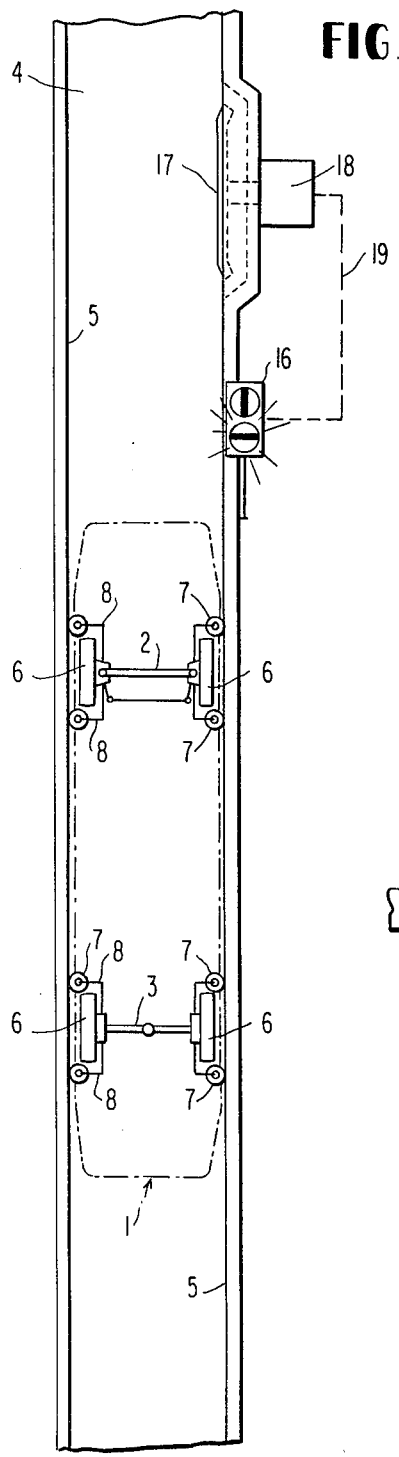

United States Patent [19]

Bertelsbeck

[11] 4,261,265
[45] Apr. 14, 1981

[54] VEHICLE WITH STEERABLE WHEELS ADAPTED TO BE USED ON TRACKS, ESPECIALLY FOR THE LOCAL PUBLIC PASSENGER TRAFFIC

[75] Inventor: Helmut Bertelsbeck, Stuttgart, Fed. Rep. of Germany

[73] Assignee: Daimler-Benz Aktiengesellschaft, Stuttgart, Fed. Rep. of Germany

[21] Appl. No.: 11,843

[22] Filed: Feb. 13, 1979

[30] Foreign Application Priority Data

Feb. 14, 1978 [DE] Fed. Rep. of Germany ....... 2806077

[51] Int. Cl.³ .......................... B61F 9/00; B60T 8/24; B61L 3/04
[52] U.S. Cl. ................... 104/247; 104/26 A; 104/119; 105/144; 180/131; 188/181 R; 246/181; 246/203 R; 280/776
[58] Field of Search ............... 104/118, 119, 245, 247, 104/26 R, 26 A; 105/141, 144; 188/34, 124, 181 R; 246/181, 182 A, 203 R; 180/79, 131; 280/776

[56] References Cited

U.S. PATENT DOCUMENTS

| | | | |
|---|---|---|---|
| 745,855 | 12/1903 | Jackman | 104/247 |
| 894,113 | 7/1908 | Brown | 246/203 R X |
| 1,339,918 | 5/1920 | Brookins | 246/181 X |
| 2,101,024 | 12/1937 | Heinze | 104/247 |
| 3,643,601 | 2/1972 | Taylor et al. | 104/119 X |
| 3,675,583 | 7/1972 | Sobey et al. | 104/247 X |

Primary Examiner—Randolph A. Reese
Attorney, Agent, or Firm—Craig & Antonelli

[57] ABSTRACT

A motor vehicle adapted to be used on tracks, especially for the public local passenger traffic, with a steerable vehicle axle and with at least one non-steerable vehicle axle and with track-determining cross-guide rollers arranged on both sides of the vehicle which are provided at least within the area of the steerable wheels and are supported near the end points of mounting arms that are relatively fixed; a force-measuring device for determining the cross-guide force is provided in the mounting or bearing support of at least one of the cross-guide rollers of each vehicle wheel while a brake pressure medium valve is adapted to be influenced by the force-measuring device in such a manner that a brake deceleration is automatically initiated when the vehicle exceeds a threshold value of the cross-guide force.

5 Claims, 2 Drawing Figures

U.S. Patent

Apr. 14, 1981

4,261,265

VEHICLE WITH STEERABLE WHEELS ADAPTED TO BE USED ON TRACKS, ESPECIALLY FOR THE LOCAL PUBLIC PASSENGER TRAFFIC

The present invention relates to a motor vehicle adapted to be used on tracks, especially for the local public passenger traffic which includes a steerable vehicle axle and a non-steerable vehicle axle, track-determining cross-guide rollers arranged on both sides of the vehicle and supported on immovable mounting arms.

With such types of vehicles adapted to be guided in tracks, it may happen that as a result of inattention of the driver, the vehicle enters a curve at an excessive velocity. This may lead to considerable cross-accelerations annoying to the vehicle passengers by reason of the centrifugal force or may lead in extreme cases also to a turning-over or derailment of the track-guided vehicle. Additionally, a stop signal may be overrun as a result of inattention by the driver.

It is the aim of the present invention to automatically prevent such occurrences, i.e., without any action on the part of the driver, or at least to lessen the effect thereof.

The underlying problems are solved according to the present invention in that one force-measuring device for determining the cross-guidance force is arranged in the bearing or mounting support of at least one of the cross-guide rollers per vehicle wheel and in that a brake pressure medium valve adapted to be influenced by the force-measuring device is provided, by way of which a brake deceleration is automatically initiated in case of exceeding a threshold value of the cross-guide force. With vehicles where within the area of the deflectable wheels one roller each is arranged pairwise in front and to the rear of the vehicle wheel or where at least one cross-guide roller is arranged on each side in fixed coordination to the vehicle frame, the cross-guide forces of the vehicle must be produced or transmitted by way of the cross-guide rollers. The lateral guide force can be measured by means of a force-measuring installation operatively connected in the force flow of the mounting support of these cross-guide rollers and in curves can be limited also to a maximum value by suitable deceleration measures.

In one embodiment of the present invention, a running-over protection of stop signals can be realized in that within the area of stop signals, a transversely movable pressure bar inset into the guide surface of at least one of the cross-guide webs is provided, which in a position of the stop signal to "stop" is displaced laterally out of the guide surface of the cross-guide web toward the vehicle road center and otherwise is retracted flush with the guide surface. In this regard, the present invention is not limited to the described type of vehicle in which the lateral guide forces are produced or transmitted by the cross-guide rollers, but the automatic over-running protection for stop signals according to the present invention is also applicable to mechanically cross-controlled vehicles wherein a cross-guide roller is arranged within the area of the steerable vehicle wheels exclusively in front of the wheels as viewed in the driving direction, which is retained in fixed coordination to the wheel plane.

Accordingly, it is an object of the present invention to provide a motor vehicle with steerable wheels adapted to be used on tracks, especially for the local public passenger traffic, which avoids by simple means the aforementioned shortcomings and drawbacks encountered in the prior art.

Another object of the present invention resides in a motor vehicle with steerable wheels for use on tracks, especially for the local public passenger traffic which not only protects the vehicle passengers against annoying cross-accelerations due to excessive centrifugal forces but reliably prevents a derailment or turning over of the vehicle in case of excessive speeds, particularly when driving through curves.

A further object of the present invention resides in a motor vehicle with steerable wheels adapted to be used on tracks which effectively minimizes the danger of accidents as a result of an inadvertent runningover of a stop signal.

Still a further object of the present invention resides in a motor vehicle with steerable wheels adapted to be used also on tracks, especially for the local public passenger traffic, which is simple in construction, yet protects the passengers by extremely simple means from inconveniences or accidents due to excessive speeds or failure to obey traffic signals.

Figure 2:
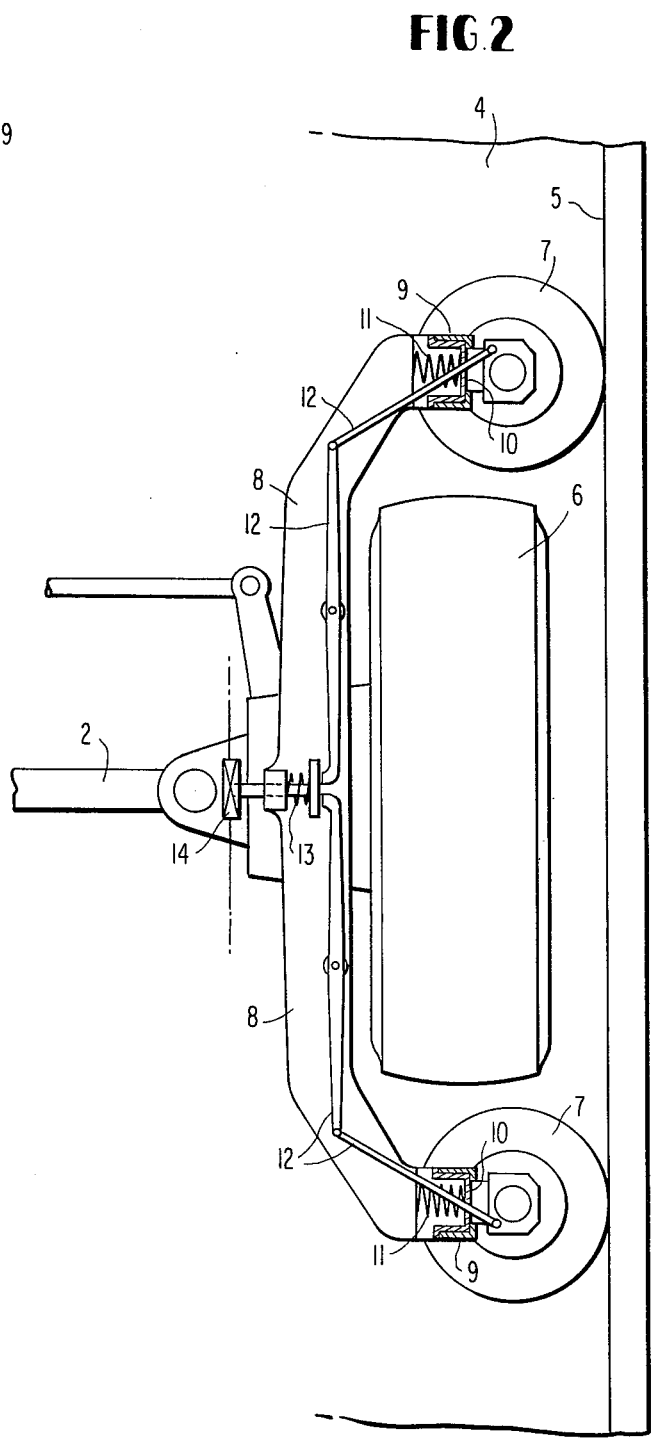

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic plan view on a section of a track with a stop signal and with an automatic stop signal overrun protection according to the present invention; and FIG. 2 is a somewhat schematic side elevational view, partly in cross section, of one embodiment of the measuring installation for measuring the cross-guide force and of a corresponding interaction on the vehicle brake in accordance with the present invention.

Referring now to the drawing wherein like reference numerals are used throughout the two views to designate like parts, the road or track section illustrated in plan view in FIG. 1, consists of a road surface 4 with vertical cross-guide webs 5 arranged trough-like on both sides thereof, which project above the road surface. A vehicle generally designated by the reference numeral 1 indicated in dash line travels on the road which includes a steerable vehicle axle 2 as well as a non-steerable rear axle 3. A pair of cross-guide rollers 7 is mounted on the vehicle 1 within the area of each vehicle wheel 6, and more particularly, one cross-guide roller 7 each is arranged in front and to the rear of the corresponding vehicle wheel 6. The cross-guide rollers 7 are retained by way of strong mounting arms 8, as a result of which the cross-guide rollers 7, remain in fixed coordination to the wheel plane. The rear axle 3, which is non-steerable as such, may be retained at the vehicle 1 pivotal about a vertical axis disposed in the vehicle center. With the pairwise arrangement of cross-guide rollers 7 per each vehicle wheel, the cross-guide rollers 7 and the corresponding mounting arms 8 are loaded and stressed by the cross forces acting on the vehicle 1. Hence, the vehicle wheels 6 do not take over any lateral guide forces.

For the protection against an excessive increase of the transverse forces in curves, a force-measuring device is arranged in the mounting supports of the cross-guide rollers 7. For that purpose, a guide sleeve 9 is provided at the end of the mounting or support arms 8, in which a guide pin 10 is able to slide in an axially movable but non-rotatable manner. The guide pin 10 carries the bearing for the cross-guide roller 7. The guide pin 10, in turn, is supported at the mounting or support arm 8 by way of a very stiff support spring 11. The support spring 11 is so selected that it is able to withstand without compression the normally occurring cross forces. Only upon exceeding the cross-guide forces acting on the rollers 7 above a predetermined threshold value, which will be noticed as unpleasant on the basis of experience, the support springs 11 will yield, which will lead to an immersion or entry of the guide pin 10 into the sleeve 9. The relative movement of the guide pin 10 with respect to the sleeve 9 and the mounting or support arm 8 is transmitted onto a valve 14 by way of a transmission linkage 12 stressed into the illustrated normal position by way of a return spring 13. This valve 14 is arranged in a brake pressure line 15. Upon response of the support spring 11 by reason of an excessive cross-force acting on the cross-guide rollers 7, the valve 14 is opened and a braking is automatically initiated. As a result of this braking, the vehicle 1 is decelerated and the centrifugal force and therewith the lateral guide force are reduced in curves to a tolerable measure.

A further application of the automatically initiated vehicle deceleration is illustrated in FIG. 1. More particularly, a laterally movable pressure bar 17 with a corresponding transverse-actuating or drive means 18 is arranged in one of the cross-guide webs 5 within the area of a stop signal 16. The pressure bar drive or actuating mechanism 18 is connected with the stop signal 16 by way of a control line. The pressure bar 17 can be brought into the illustrated position when the stop signal is in the "stop" position, in which the pressure bar 17 projects out of the guide surface of the guide cross-web 5 laterally toward the road center and so acts on the cross-guide rollers of a passing vehicle that a very strong braking deceleration of the vehicle is automatically initiated. In the position of the stop signal 16 to "free", the pressure bar 17 is retracted flush with the guide surface of the cross-guide web 5 in such a manner that no interaction is exerted on the cross-guide rollers 7 of a passing vehicle 1. This application of the present invention is meaningful not only with vehicles of the illustrated type having cross-guide rollers 7 arranged pairwise per each vehicle wheel 6 but also with mechanically cross-controlled vehicles 7 having cross-guide rollers arranged unilaterally in front of the steerable wheels as viewed in the driving direction.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motor vehicle adapted to be used on tracks, comprising a steerable vehicle axle means and at least one nonsteerable vehicle axle means, at least one pair of track-determining cross-guide roller means arranged on both sides of the vehicle including substantially vertical roll-off surface means projecting laterally beyond an outer contour of a vehicle wheel, said cross-guide roller means being provided at least within the area of the vehicle wheel and being each supported near the end points of mounting support means that are relatively immovable with respect to the vehicle wheel, characterized in that one cross-guide roller means is provided at least in front of the vehicle wheel and one cross-guide roller means is provided at least behind the vehicle wheel, at least one force-measuring means for determining the cross-guide force is arranged in the mounting support means of at least one of the cross-guide roller support means per vehicle wheel, and in that a brake pressure medium valve means is provided which is operable to be influenced by the force-measuring means, said brake pressure medium valve means being operable to automatically initiate a brake deceleration of the vehicle when a predetermined threshold value of the cross-guide force is exceeded.

2. A motor vehicle according to claim 1, characterized in that mounting support means includes bearing support means, and in that the force-measuring means is arranged in the bearing support means.

3. A motor vehicle according to claim 1, characterized in that the vehicle is for the public local passenger traffic.

4. A traffic system comprising road means and motor vehicles according to claim 1 or 3, the road means including roll-off surface means and track-determining cross-guide web means arranged laterally trough-like thereon, and stop means at the road means, characterized in that within the area of a stop signal means a transversely movable pressure bar means is inset into the guide surface of at least one of the cross-guide web means, said pressure bar means being displaced laterally out of the guide surface of the cross-guide web means toward the center of the road means in the position of the stop signal means to "stop" while the pressure bar means is otherwise retracted flush with the guide surface means.

5. A motor vehicle adapted to be used on tracks, comprising a steerable vehicle axle means and at least one nonsteerable vehicle axle means, at least one track-determining cross-guide roller means arranged on both sides of the vehicle frame in a fixed coordination, characterized in that at least one force measuring means for determining the cross-guide force is arranged in the mounting support means of at least one of the cross-guide roller means, and in that a brake pressure medium valve means is provided which is operable to be influenced by the force-measuring means, said brake pressure medium valve means being operable to initiate a brake deceleration of the vehicle when a predetermined threshold value of the cross-guide force is exceeded.

* * * * *